April 7, 1925.  
E. G. WRIGHT  
MOTOR VEHICLE LIGHT BRACKET  
Original Filed June 11, 1923
1,532,642
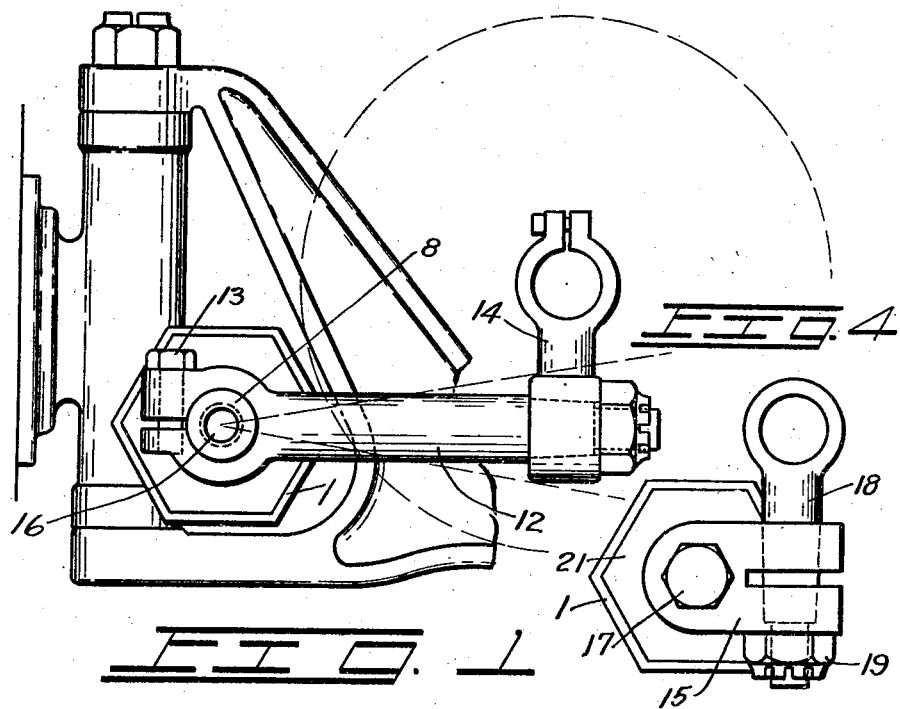
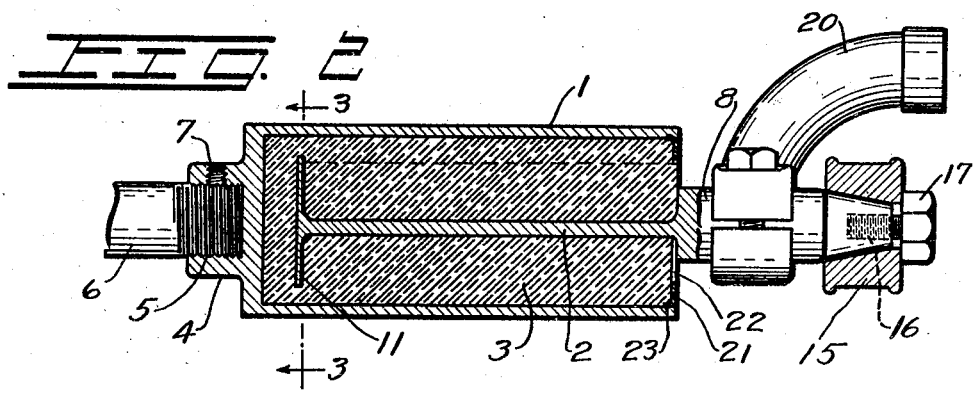
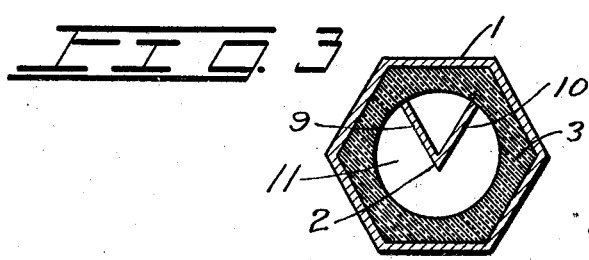
INVENTOR  
Emmett G. Wright  
Harry Bowen  
ATTORNEY Patented Apr. 7, 1925.

1,532,642

UNITED STATES PATENT OFFICE.

EMMETT G. WRIGHT, OF SEATTLE, WASHINGTON.

MOTOR-VEHICLE-LIGHT BRACKET.

Application filed June 11, 1923, Serial No. 644,724. Renewed March 2, 1925.

*To all whom it may concern:*

Be it known that I, EMMETT G. WRIGHT, a citizen of the United States, residing at Seattle, county of King, and State of Washington, have invented a new and useful Motor-Vehicle-Light Bracket; and I do hereby declare that the following is a full, clear, and exact specification, such as will enable others skilled in the art to which it appertains to make and use the same.

The invention is a bracket for attaching lamps to motor vehicles which will absorb vibrations or a sudden shock.

The object of the invention is to provide a bracket by which a light may be directly connected to a motor vehicle wheel knuckle without transmitting the shock from the wheel to the light.

Another object of the invention is to provide a means for attaching a light to a motor vehicle so that the light will turn with the front wheels.

And a further object of the invention is to provide a shock absorber that has a casing, a veined core and a resilient substance between the core and the casing.

With these ends in view the invention embodies a hexagonal shaped casing, having a hub on one end, a veined core with a disc on its inner end and a projection on its outer end inside of the casing, and a resilient material between the core and the casing.

Other features and advantages of the invention will appear from the following description taken in connection with the drawings, wherein:—

Figure 1 is a front view showing the bracket as it would appear when attached to the front end of the steering knuckle bolt.

Figure 2 is a longitudinal section through the shock absorber.

Figure 3 is a cross section on line 3—3 of Figure 2.

Figure 4 is a view looking in the same direction as Figure 1 showing an alternate arrangement.

In the drawings I have shown my bracket as it would appear in use wherein numeral 1 indicates the casing, numeral 2 the core, and numeral 3 the resilient material between the core and the casing.

The casing 1 may be hexangular, as shown, or may have any number of sides or may be tubular as may be desired. On the rear end is a hub 4 which has a threaded hole 5 in it by which the casing may be screwed on the end of the spindle arm or bolt that connects the end of the tie rod to the steering knuckle, which I have indicated by the numeral 6. It will be seen that the nut on the front end of this bolt may be removed and replaced by the casing 1, which may be held in place by a set screw 7.

The core 2 may be made as shown with a round hub 8 on its outer end, which has veins 9 and 10 projecting from it and these veins have a disc 11 attached to their inner ends. It is understood that the veins 9 and 10 may be arranged as shown in Figure 3 or may be arranged at any desired angle, and it is further understood that any desired number of veins may be used.

An arm 12 may be placed on the hub 8 and clamped to it by a bolt 13 as shown in Figure 1, and at the outer end of this arm a vertical post 14, in which the lamp may be placed, may be held by a nut, as shown; or a clamp 15 may be held in a threaded hole 16 in the end of the hub 3 by a screw 17, as shown in Figure 4, and a post 18 in which the lamp may be placed, may be held in the clamp 15 by a nut 19. An elbow 20 may also be held by a clamp to the hub 8 as shown in Figure 2 and the lamp screwed into it. A washer 21, having an opening 22 in it may be snapped into the groove 23 in the end of the sleeve 1 to form a cover for the end of the casing.

It will be understood that changes may be made in the construction without departing from the spirit of the invention. One of these changes may be in the length or size of the casing 1 or in the means for attaching it to the steering knuckle. Another change may be in the use of any other resilient substance between the core and the casing; and still another change may be in the means of attaching the lamp to the core of the shock absorber.

The construction will be readily understood from the foregoing description. To use the device it may be attached to the end of the bolt of the steering knuckle as hereinbefore described and the lamp may be attached to the forward end as shown, or in any desired manner. It will be seen that with a bracket of this type it will be possible to attach a lamp directly to the steering knuckle without danger of the shock or vibrations breaking the lamp; as with the lamp over-hung from the center it will twist the veins in the casing about the center as shown by the dotted lines in Figure 1, as the wheel moves upward and downward and it will also be seen that the hub of the arm 12 may also move upward and downward. By arranging the veins 9 and 10, as shown in Figure 3, it will be possible to obtain the maximum amount of resiliency in the twisting motion, and by placing a disc 11 at the inner end of the core the inner end will be located and held in the position shown.

Having thus fully described the invention what I claim as new and desire to secure by Letters Patent, is:—

1. A bracket for motor vehicle lights embodying a casing having a hub on one end with a threaded hole in it, a core having veins arranged in the shape of a V, a disc at the inner ends of the veins, a hub at the outer end of the veins, a resilient material between the core and the casing, an arm with a clamp on one end by which it may be attached to the hub of the core, and its other end made so that a post may be attached to it, and a post with a means for attaching it to the end of the arm and a clamp for holding a lamp.

2. A lamp-bracket comprising a tubular shaped casing; a means for attaching the casing to the steering knuckle that supports the front wheel, a winged core longitudinally supported inside of the casing by a resilient means; a disc at the inner end of the core, a hub at the outer end of the core, an arm extending horizontally at right angles to the core and attached to the hub by a clamp, and a means at the outer end of the arm for attaching a lamp thereto.

3. A bracket for motor vehicle lamps embodying a tubular shaped casing having a hub on one end; a core having outwardly extending veins in the casing; means at the inner end of the core for preventing its outward movement; a resilient material between the core and the casing, said core having a hub at its outer end; a closure at the outer end of the casing with a slotted opening in it to permit the core to move freely; a means for attaching the hub at one end of the casing to the vehicle so that it will move with the front wheels; and a means for attaching a lamp to the outer end of the core.

EMMETT G. WRIGHT.